(12) United States Patent
Kodama et al.

(10) Patent No.: US 8,207,276 B2
(45) Date of Patent: Jun. 26, 2012

(54) DIP FORMING LATEX COMPOSITION AND DIP FORMED ARTICLE

(75) Inventors: Kazumi Kodama, Tokyo (JP); Shinji Kato, Kanagawa (JP)

(73) Assignee: Zeon Corporation, Tokyo (JP)

( * ) Notice: Subject to any disclaimer, the term of this patent is extended or adjusted under 35 U.S.C. 154(b) by 158 days.

(21) Appl. No.: 12/715,110

(22) Filed: Mar. 1, 2010

(65) Prior Publication Data

US 2010/0160568 A1 Jun. 24, 2010

Related U.S. Application Data

(63) Continuation of application No. 11/920,635, filed as application No. PCT/JP2006/309940 on May 18, 2006, now abandoned.

(30) Foreign Application Priority Data

May 20, 2005 (JP) ................................. 2005-148549
May 20, 2005 (JP) ................................. 2005-148552

(51) Int. Cl.
*C08F 36/08* (2006.01)
*C08C 19/00* (2006.01)

(52) U.S. Cl. ................................. 525/333.1; 525/332.5

(58) Field of Classification Search ................. 525/333.1
See application file for complete search history.

(56) References Cited

U.S. PATENT DOCUMENTS

| | | | |
|---|---|---|---|
| 6,566,435 B1 | 5/2003 | Teoh et al. | |
| 6,844,385 B1 | 1/2005 | Hagiwara et al. | |
| 2003/0050377 A1* | 3/2003 | Hagiwara et al. | 524/418 |
| 2003/0141633 A1 | 7/2003 | McGlothlin et al. | |
| 2006/0235158 A1* | 10/2006 | Ota et al. | 525/212 |
| 2007/0082152 A1 | 4/2007 | Kodama | |

FOREIGN PATENT DOCUMENTS

| | | |
|---|---|---|
| JP | 10-95963 A | 4/1998 |
| JP | 2002-527632 A | 8/2002 |
| JP | 2003-528229 A | 9/2003 |
| JP | 2003-530255 A | 10/2003 |
| WO | WO-01/72158 A1 | 10/2001 |
| WO | WO 2005/012375 A1 | 2/2005 |
| WO | WO 2005012375 A1 * | 2/2005 |
| WO | WO-2005/049725 A1 | 6/2005 |

OTHER PUBLICATIONS

U.S. Office Action issued in U.S. Appl. No. 11/920,635 on May 29, 2009.
U.S. Office Action issued in U.S. Appl. No. 11/920,635 on Oct. 28, 2009.

* cited by examiner

*Primary Examiner* — Ling Choi
*Assistant Examiner* — Hui Chin
(74) *Attorney, Agent, or Firm* — Birch, Stewart, Kolasch & Birch, LLP

(57) ABSTRACT

A dip-forming latex composition comprising a conjugated diene rubber latex and an organic peroxide, wherein the residual effective activity of organic peroxide defined as the ratio of organic peroxide retaining reactivity to the whole organic peroxide contained in the latex composition is 35% or higher. The invention provides a dip-formed article, which exhibits good softness of touch and comfortable fittingness and excellent in tensile strength and resistance to flexing fatigue; which itself hardly suffers coloration especially when the article thereof is worn as a glove for continuous operation for a long time and is hard to reduce adhesiveness and following characteristics to hand while wearing it; and a dip-forming latex composition capable to give such an article by dip-forming thereof.

9 Claims, No Drawings

DIP FORMING LATEX COMPOSITION AND DIP FORMED ARTICLE

This application is a Continuation of application Ser. No. 11/920,635 filed on Nov. 19, 2007, now abandoned which is a national phase of PCT/JP2006/309940 filed on May 18, 2006, and for which priority is claimed under 35 U.S.C. §120; and this application claims priority of Application No. 2005-148549 filed in Japan on May 20, 2005, and Application No. 2005-148552 filed in Japan on May 20, 2005, under 35 U.S.C. §119; the entire contents of all are hereby incorporated by reference.

TECHNICAL FIELD

The present invention relates to a dip-forming latex composition and a dip-formed article, and especially relates to a dip-forming latex composition capable to give articles having excellent tensile strength and resistance to flexing fatigue, and a dip-formed article obtained by dip-forming of the composition.

BACKGROUND ART

Rubber globes are widely used for homemaking, food related industry, precision industry, healthcare, etc. Conventionally, as rubber gloves having high tensile strength and excellent oil resistance, there are often used dip-formed articles obtained by dip-forming of a latex composition comprising carboxylated acrylonitrile-butadiene copolymer latex, sulfur and a curing accelerator.

For example, Patent Document 1 discloses a rubber glove (dip-formed article) obtained by dip-forming of a latex composition comprising carboxylated acrylonitrile-butadiene copolymer latex, zinc oxide, sulfur and a curing accelerator. The glove of the document exhibits good softness of touch, but has a problem of poor retention ratio of stress, so that it reduces adhesiveness to hand and finger and hardly follows the movement of the back of user's hand and finger while wearing it, resulting in making fine manipulation difficult.

Further, Patent Document 2 discloses a rubber glove (dip-formed article) obtained by dip-forming of a latex composition comprising a carboxylated acrylonitrile-butadiene copolymer latex, sulfur and a curing accelerator but not zinc oxide. The glove of the document exhibits good softness of touch, but has a problem of significant reduction in tensile strength.

Patent Document 3 discloses a rubber glove (dip-formed article) obtained by dip-forming of a latex composition comprising an acrylonitrile-butadiene copolymer latex containing a specific amount of carboxyl groups, a small amount of zinc oxide, a relatively large amount of sulfur and a curing accelerator. According to the document, remaining stress of the glove is 50% to 70% after 6 minutes of 100% elongation. However, it is required to stir for aging for a long time, i.e., more than 16 hours, after adding the curing accelerator to the latex to achieve the above property (remaining stress of 50% to 70%). Therefore, it deteriorates productivity.

In addition, the above-mentioned rubber gloves of Patent Documents 1 to 3 containing sulfur and a curing accelerator as essential components cause problems that odor due to sulfur brings discomfort and that the glove itself suffers coloration, which significantly lowers its commercial value, when continuing operation for a long time with wearing it.

On the other hand, it is studied to use an organic peroxide as a crosslinker as a method to obtain a dip-formed article without using sulfur and a curing accelerator. For example, Patent Document 4 discloses a dip-formed article obtained by dip-forming of a latex composition comprising an organic peroxide such as dicumyl peroxide or di-t-butyl peroxide. It is required to crosslink in a chemically inactive solvent such as melted salt, so that crosslinking reaction is performed in melted salt bath at a considerably high temperature when obtaining a dip-formed article of the document 4. Therefore, a rubber glove as the dip-formed article disclosed in the document 4 has problems of coloration due to exposure to a high temperature during production. There is another problem that low resistance to flexing fatigue causes tiny cracks in crotch of fingers in use for 2 to 3 hours for instance.

[Patent Document 1] U.S. Pat. No. 5,014,362
[Patent Document 2] WO 97/48765
[Patent Document 3] WO 00/21451
[Patent Document 4] WO 01/77210

DISCLOSURE OF INVENTION

Problem to be Solved by the Invention

An object of the present invention is to provide a dip-forming latex composition capable to give an article, which exhibits good softness of touch and excellent in tensile strength and resistance to flexing fatigue; and which itself hardly suffers coloration especially when the article is worn as a glove for continuous operation for a long time and is hard to reduce fitting and following characteristics to hand while wearing it; and a dip-formed article obtained by dip-forming of such a dip-forming latex composition.

Means for Solving the Problem

To attain the above object, according to the first aspect of the present invention, there is provided a dip-forming latex composition comprising a conjugated diene rubber latex and an organic peroxide, wherein residual effective activity of the organic peroxide, defined as a ratio of organic peroxide retaining reactivity to the whole organic peroxide included in the dip-forming latex composition, is 35% or higher.

Preferably, a pH value of the latex composition is 9 or lower in the first aspect.

Preferably, 10-hour half-life temperature of the organic peroxide is 150° C. or lower in the first aspect.

Preferably, a content of the organic peroxide included in the latex composition is 0.01 to 5 parts by weight based on 100 parts by weight of solid content of the conjugated diene rubber latex in the first aspect.

Preferably, the conjugated diene rubber latex is a carboxylated nitrile rubber latex in the first aspect.

Further, according to the first aspect of the present invention, there is provided a dip-formed article obtained by dip-forming of any of the above dip-forming latex compositions.

Alternatively, according to the second aspect of the present invention, there is provided a dip-formed article obtained by dip-forming of a dip-forming latex composition comprising a carboxylated nitrile rubber latex and an organic peroxide, wherein retention ratio of stress, defined as a ratio [(M100(6)/M100(0))×100] where M100(0) is initial tensile stress at 100% elongation and M100(6) is tensile stress after 6 minutes of 100% elongation, is 50% or higher.

Preferably, latex particle in the carboxylated nitrile rubber latex included in the dip-forming latex composition is cross-linked within the particle in the second aspect.

Preferably, latex particle in the carboxylated nitrile rubber latex included in the dip-forming latex composition contains 50-90 wt % of insoluble content in methyl ethyl ketone in the second aspect.

Preferably, a content of the organic peroxide included in the dip-forming latex composition is 0.01 to 5 parts by weight based on 100 parts by weight of solid content of the carboxylated nitrile rubber latex in the second aspect.

Preferably, residual effective activity of the organic peroxide, defined as a ratio of organic peroxide retaining reactivity to the whole organic peroxide included in the dip-forming latex composition, is 35% or higher in the second aspect.

Effects of the Invention

The dip-forming latex composition according to the first aspect of the present invention comprises a conjugated diene rubber latex and an organic peroxide, and also controls residual effective activity of the organic peroxide within the above predetermined range. Therefore, the dip-forming latex composition according to the first aspect can provide a dip-formed article that exhibits good softness of touch; that is excellent in tensile strength and resistance to flexing fatigue; that is hardly suffers coloration and odor even when using for a long time; that is high in elasticity and easy to fit users' hands and fingertips.

The dip-formed article according to the second aspect of the present invention is obtained by dip-forming of a dip-forming latex composition comprising a carboxylated nitrile rubber latex and an organic peroxide, and also has a characteristic that retention ratio of stress is 50% or more. Therefore, it exhibits good softness of touch, and is excellent in tensile strength and resistance to flexing fatigue, as well as other characteristics that it hardly suffers coloration and odor even when using for a long time. It has high elasticity, and it excellently fits users' hands and fingertips especially when the article is a glove. It also effectively prevents reducing fitting characteristics due to long period of use.

Consequently, the dip-formed articles according to the first and second aspects of the present invention are good in use as a rubber glove, and especially useful in the fields that require fine manipulation for a long time, such as semiconductor industry and healthcare industry working in clean room.

Further, since the organic peroxide is used as a crosslinker in addition to the above, desired characteristics can be obtained without aging treatment for a long time in the present invention. Therefore, it allows reducing the time to produce the dip-formed article, especially the dip-forming latex composition therefor, resulting in decrease in manufacturing machines and improved productivity.

BEST MODE FOR CARRYING OUT THE INVENTION

First Embodiment

The dip-forming latex composition according to the first aspect of the present invention and the dip-formed article obtained by dip-forming of the latex composition will be explained below.

Dip-Forming Latex Composition

The dip-forming latex composition according to the first aspect of the present invention includes at least a conjugated diene rubber latex and an organic peroxide.

Conjugated Diene Rubber Latex

The conjugated diene rubber latex used in the first aspect is not particularly limited, and includes synthetic rubber latex and natural rubber latex. Synthetic rubber latex is preferable since characteristics of the dip-formed article can be altered as desired.

A preferred synthetic rubber latex includes a conjugated diene rubber latex obtained by emulsion polymerization of a monomeric mixture comprising a conjugated diene monomer, an ethylenically unsaturated acid monomer, and another monomer copolymerizable with them added as necessary. Essential use of an ethylenically unsaturated acid monomer provides a dip-formed article with more improved tensile strength.

A conjugated diene monomer is not particularly limited, and is preferably a compound having 4 to 12 carbon atoms and including a conjugated diene. As the conjugated diene monomer, there may be mentioned 1,3-butadiene, isoprene, 2,3-dimethyl-1,3-butadiene, 2-ethyl-1,3-butadiene, 1,3-pentadiene, chloroprene, etc. Among them, 1,3-butadiene and isoprene are preferable, and 1,3-butadiene is particularly preferable. These conjugated diene monomers can be used alone or in a combination of two or more. The amount of the conjugated diene monomer unit included in the obtained synthetic rubber latex is preferably 30 to 88 wt %, more preferably 50 to 84 wt %, and particularly preferably 55 to 81 wt %. Too small amounts tend to give articles with poor feel while too large amounts tend to give those with low tensile strength.

An ethylenically unsaturated acid monomer is not particularly limited, and includes a carboxyl group-containing ethylenically unsaturated monomer, a sulfonic acid group-containing ethylenically unsaturated monomer, a phosphoric acid group-containing ethylenically unsaturated monomer, etc.

As a carboxyl group-containing ethylenically unsaturated monomer, there may be mentioned an ethylenically unsaturated compound having 3 to 18 carbon atoms and containing carboxyl group. Such a carboxyl group-containing ethylenically unsaturated monomer includes an ethylenically unsaturated monocarboxylic acid such as acrylic acid, methacrylic acid and crotonic acid; an ethylenically unsaturated polycarboxylic acid and its anhydride such as fumaric acid, maleic acid, itaconic acid, maleic anhydride and itaconic acid anhydride; and partial ester of ethylenically unsaturated polycarboxylic acid such as methylmaleic acid and methylitaconic acid.

As a sulfonic acid group-containing ethylenically unsaturated monomer, for example, there may be mentioned vinyl sulfonic acid, methylvinylsulfonic acid, styrenesulfonic acid, (meth)allylsulfonic acid, 2-sulfonylethyl(meth)acrylate, 2-acrylamido-2-hydroxypropane sulfonic acid, etc.

As a phosphoric acid group-containing ethylenically unsaturated monomer, for example, there may be mentioned 3-chloro-2-propylphosphoryl(meth)acrylic acid, 2-ethylphosphoryl(meth)acrylic acid, 3-allyloxy-2-hydroxypropanephosphoric acid, etc.

These ethylenically unsaturated acid monomers can be used as alkali metal salts or ammonium salts, and can be used alone or in combination of two or more. Among the above-mentioned ethylenically unsaturated acid monomer, carboxyl group-containing ethylenically unsaturated monomers are preferred, ethylenically unsaturated monocarboxylic acids are more preferred, and methacrylic acid is especially preferred.

The amount of an ethylenically unsaturated acid monomer unit included in the obtained synthetic rubber latex is preferably 0.5 to 10 wt %, more preferably 1 to 9 wt %, and particularly preferably 2 to 8 wt %. Too small amounts tend to give articles with low tensile strength while too large amounts tend to give those with poor feel.

As another monomer copolymerizable with the conjugated diene monomer and the ethylenically unsaturated acid monomer added as necessary (hereinafter may refer to as "other monomers"), although not particularly limited, the following monomers may be mentioned, for example:

ethylenically unsaturated nitrile monomers such as acrylonitrile, methacrylonitrile, 2-chloropropenenitrile and 2-butenenitrile; aromatic vinyl monomers such as styrene, α-methylstyrene, monochlorostyrene, dichlorostyrene, trichlorostyrene, monomethylstyrene, dimethylstyrene, trimethylstyrene and hydroxymethylstyrene; ethylenically unsaturated carboxylic amide monomers such as acrylamide, methacrylamide, N,N-dimethylacrylamide and N-methylolacrylamide; ethylenically unsaturated carboxylic acid alkyl ester monomers such as methyl(meth)acrylate, ethyl (meth)acrylate, butyl(meth)acrylate and 2-ethylhexyl(meth) acrylate; vinyl carboxylate monomers such as vinyl acetate, vinyl propionate and vinyl versatate; halogenated vinyl monomers such as vinyl chloride, vinylidene chloride, vinyl fluoride and vinylidene fluoride; olefin monomers such as ethylene, propylene, 1-butene and isobutene; vinyl ether monomers such as methyl vinyl ether, n-propyl vinyl ether, isobutyl vinyl ether and dodecyl vinyl ether; (meth)allyl compounds such as allyl acetate, methallyl acetate, allyl chloride and methallyl chloride; vinylsilyl compounds such as vinyltrimethoxysilane; vinylpyridine; and N-vinylpyrrolidone, etc. These can be used alone or in combination of two or more.

Among these other monomers, aromatic vinyl monomers and ethylenically unsaturated nitrile monomers are preferable since they can improve tensile strength of the dip-formed article; and ethylenically unsaturated nitrile monomers are more preferable since they can improve oil resistance of the dip-formed article. The amount of the above-mentioned other monomer unit included in the obtained synthetic rubber latex is preferably 2 to 69.5 wt % or lower, more preferably 7 to 49 wt %, and particularly preferably 11 to 43 wt %. Within the above range, tensile strength, oil resistance and feel of articles can be well maintained.

In the first aspect of the present invention, it is preferable to use a conjugated diene monomer, a carboxyl group-containing ethylenically unsaturated monomer and an ethylenically unsaturated nitrile monomer as monomers constituting a conjugated diene rubber latex, and to have a carboxylated nitrile rubber latex as the conjugated rubber latex. By using a carboxylated nitrile rubber latex having the above constitution as a conjugated rubber latex constituting a dip-forming latex composition, a dip-formed article, which is flexible and excellent in oil resistance and mechanical strength, and has sufficiently high tensile strength and break elongation, can be obtained.

Next, a production method of the conjugated diene rubber latex used in the present invention will be explained.

The conjugated diene rubber latex used in the present invention can be produced by emulsion polymerization of mixture of each of the above-mentioned monomers. As a method of emulsion polymerization, methods known in the art can be used. On emulsion polymerization, usually employed auxiliary agents for polymerization such as emulsifiers, initiators and molecular weight modifiers can be used. The method to add these auxiliary agents is not particularly limited. They may be added initially at once, portionwise or continuously.

As an emulsifier, although not particularly limited, there may be mentioned, for example, anionic surfactant, non-ionic surfactants, cationic surfactants, amphoteric surfactants, etc. Among these, it is preferable to use anionic surfactants such as alkylbenzenesulfonates, aliphatic sulfonates and salts of sulfate esters of higher alcohols, α-olefin sulfonates and salts of alkyl ether sulfate esters. The amount of emulsifiers is preferably 0.5 to 10 parts by weight and more preferably 1 to 8 parts by weight, based on 100 parts by total weight of monomers.

As an initiator, although not particularly limited, radical initiators can be preferably used. As the radical initiators, for example, there may be mentioned inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide, t-butyl cumyl peroxide, acetylperoxide, isobutyryl peroxide, octanoyl peroxide, dibenzoyl peroxide, 3,5,5-trimethylhexanoyl peroxide and t-butyl peroxyisobutyrate; azo compounds such as azobisisobutyronitrile, azobis-2,4-dimethylvaleronitrile, azobiscyclohexanecarbonitrile and methyl azobisisobutyrate. These initiators can be used alone or in a combination of two or more. Among these radical initiators, inorganic or organic peroxides are preferable, inorganic peroxides are more preferable, and persulfates are particularly preferable. The amount of initiators is preferably 0.01 to 2 parts by weight, and more preferably 0.05 to 1.5 parts by weight based on 100 parts by weight of total monomers.

As a molecular weight modifier, although not particularly limited, there may be mentioned, for example, α-methylstyrene dimer; mercaptans such as t-dodecylmercaptan, n-dodecylmercaptan and octylmercaptan; halogenated hydrocarbons such as carbon tetrachloride, methylene chloride and methylene bromide; and sulfur-containing compounds such as tetraethylthiuram disulfide, dipentamethylenethiuram disulfide and diisopropylxanthogene disulfide. These can be used alone or in a combination of two or more. Among these, mercaptans are preferably used, and t-dodecylmercaptan is more preferred. Preferable amount of the molecular weight modifier is, although depending on the kind of modifier, 0.1 to 0.8 part by weight, more preferably 0.2 to 0.7 part by weight, based on 100 parts by weight of total monomers.

In the present invention, other auxiliary agents for polymerization can be used if required. The other auxiliary agents include chelator, dispersant, pH adjuster, deoxidant and particle size modifier. The kind and amount of auxiliary agents are not limited.

Emulsion polymerization is usually carried out in water by using the above monomers and auxiliary agents for polymerization. Polymerization temperature is, although not particularly limited, usually 0 to 95° C. and preferably 5 to 70° C. After polymerization is terminated, if desired, unreacted monomers are removed and the solid content and the pH value are adjusted to obtain the conjugated diene rubber latex.

In the first aspect of the present invention, a pH value of the conjugated diene rubber latex is preferably adjusted to 9 or lower, more preferably into the range of 7 to 9, and furthermore preferably into the range of 7.5 to 8.7. By adjusting a pH value of the conjugated diene rubber latex within the above range, it can be effectively prevented to deactivate an organic peroxide due to degradation when adding the organic peroxide to the conjugated diene rubber latex to obtain a dip-forming latex composition. Therefore, it is an effective way as a means to control residual effective activity of the organic peroxide as described below that a pH value of the conjugated diene rubber latex before adding the organic peroxide is adjusted within the above range.

Organic Peroxide

An organic peroxide used in the present invention is solid at normal pressures and at 30° C., and 10-hour half-life temperature thereof is preferably 150° C. or lower, more preferably 130° C. or lower and particularly preferably 40° C. or higher and 120° C. or lower. Note that 10-hour half-life temperature indicates a temperature where the amount of organic peroxide retaining activity reduces by half when heating it at the temperature for 10 hours. That is, the amount of the active organic peroxide with 10-hour half-life temperature of 100° C. reduces by half when heating it at 100° C. for 10 hours.

Such an organic peroxide includes dibenzoyl peroxide, benzoyl(3-methylbenzoyl)peroxide, di(4-methylbenzoyl) peroxide, dilauroyl peroxide, distearoyl peroxide, di-α-cumyl peroxide, 1,1-bis(tert-butylperoxy)cyclododecane, succinic acid peroxide, bis(4-tert-butylcyclohexyl)peroxydicarbonate and tert-butylperoxymaleic acid. These can be used alone or in a combination of two or more. Among these, dibenzoyl peroxide and dilauroyl peroxide are preferably used, resulting in obtaining a dip-formed article well balanced in physical properties.

The amount of organic peroxide is preferably 0.01 to 5 parts by weight, more preferably 0.05 to 3 parts by weight and particularly preferably 0.1 to 2 parts by weight based on 100 parts by weight of solid content of the conjugated diene rubber latex. Too small amounts tend to give articles with inferior resistance to flexing fatigue while too large amounts tend to give those with poor softness of touch and low tensile strength.

In the first aspect of the present invention, the residual effective activity of an organic peroxide, defined as a ratio of organic peroxide actually retaining reactivity to the whole organic peroxide initially added into the dip-forming latex composition, is 35% or higher, preferably 40% or higher and more preferably 45% or higher. It is the greatest characteristic of the first aspect of the present invention to control the residual effective activity of the organic peroxide within the above range. It results in improving retention ratio of stress, resistance to flexing fatigue and the fitting characteristics of the dip-formed article.

Measuring method is, although not particularly limited, there may be mentioned a method to measure an amount of the organic peroxide having activity by iodimetry, etc., for example. The method provides the residual effective activity as a weight ratio of the amount of the organic peroxide having activity per total amount of actually added organic peroxide.

The compound deactivated due to degradation may mainly become an acid among added organic peroxide. The amount of such a deactivated compound can be measured by HPLC, etc. Too large amount of the deactivated compound may lower the pH value of the latex composition, resulting in the dip-formed article with low tensile strength.

Preparation of Dip-Forming Latex Composition

The dip-forming latex composition according to the first aspect of the present invention can be prepared by adding the above-mentioned organic peroxide to the above-mentioned conjugated diene rubber latex.

Although the method to add organic peroxide into the conjugated diene rubber latex is not particularly limited, a preferred method in the first aspect of the present invention includes preliminarily dispersing organic peroxide in an aqueous medium in the presence of surfactant and protected polymeric colloid to prepare an aqueous dispersion of organic peroxide, and adding the dispersion to the conjugated diene rubber latex. Thus prepared aqueous dispersion is possible to effectively prevent organic peroxide from separation and precipitation.

As a method to prepare an aqueous dispersion of organic peroxide, there may be mentioned, for example, a method to disperse organic peroxide by vigorously stirring it in an aqueous medium wherein surfactant and/or protected polymeric colloid are dissolved. In this case, organic peroxide may be also dissolved in advance in an organic solvent, wherein organic peroxide is soluble, in order to obtain organic peroxide solution, and then, added to the aqueous medium wherein surfactant and/or protected polymeric colloid are dissolved.

A surfactant is not particularly limited as far as it is a commonly used surfactant such as anionic surfactant, nonionic surfactant, cationic surfactant or amphoteric surfactant. Also, a protected polymeric colloid is not particularly limited as far as it is a polymeric dispersion stabilizer having molecular weight of 10,000 or more. For example, gelatin; polyvinyl alcohol; a cellulose derivative such as methyl cellulose, hydroxyalkylmethyl cellulose hydroxypropoxymethyl cellulose, carboxymethyl cellulose and microcrystal cellulose; etc. can be used as the protected polymeric colloid.

The above aqueous dispersion of organic peroxide and optional components added according to need is added to conjugated diene rubber latex and mixed. In the first aspect, it is preferred to age after adding and mixing these. Aging is carried out by stirring preferably at 10 to 50° C., more preferably at 15 to 35° C. and particularly preferably at 20 to 30° C., preferably for an hour or more, more preferably for an hour to 2 weeks and particularly preferably for an hour to a week. Insufficient aging may cause separation and precipitation of organic peroxide from the conjugated diene rubber latex, which is difficult to function as a crosslinker. It is also preferable to adjust a pH value of the conjugated diene rubber latex before adding organic peroxide in the range of 7 to 9.

In the present invention, since the above mentioned organic peroxide is used as a crosslinker, it is possible to obtain a dip-formed article having desired characteristics even when the aging time is relatively short as above. Therefore, aging treatment can be performed at short times compared to using sulfur as a crosslinker for example, resulting in improvement in productivity.

In the present invention, concentration of solid content of the dip-forming latex composition is prepared to be preferably 20 to 40 wt % and more preferably 25 to 35 wt %. By making the concentration of solid content within the above range, it is possible to easily produce a dip-formed article having uniform film thickness. Also, a pH value after adding organic peroxide is preferably 9 or lower and more preferably in the range of 7 to 8.7. By adjusting a pH value within the above range, it is possible to effectively prevent degradation of organic peroxide. On the other hand, too high pH value tend to result in easy degradation of organic peroxide, so that it is difficult to store for a long period of time, and that storing stability tend to be inferior.

Note that large amount of commonly used sulfur and curing accelerator tends to give a dip-formed article having unbalanced physical properties since the dip-forming latex composition according to the first aspect includes organic peroxide as a crosslinker. Therefore, contents of sulfur and curing accelerator is preferably smaller, and most preferably zero for a balance of physical properties of the dip-formed article. Zinc oxide may be also included within the scope of not affecting the effect of the present invention to ionically cross-link between carboxyl groups when the above conjugated diene rubber latex has carboxyl groups.

Dip-Formed Article

The dip-formed article according to the first aspect of the present invention can be obtained by dip-forming of the above-mentioned dip-forming latex composition according to the first aspect. As a method of dip-forming, there may be used methods known in the art such as direct dipping method, anode coagulant dipping method, teague coagulant dipping method, etc. Among them, anode coagulant dipping method is preferred on the point that it readily provides dip-formed articles with uniform thickness. Below, the dip-forming method using anode coagulant dipping method will be explained as an embodiment.

First, a dip-forming mold is dipped in a coagulant solution to adhere the coagulant to its surface. As a dip-forming mold, there may be used various molds such as those made of ceramics, glass, metal, plastics, etc. Shape of mold corresponds to the shape of dip-formed article, which is a final product. When the dip-formed article is a glove for instance, the dip-forming mold may have various shapes such as one from a wrist to fingertips, one from an elbow to fingertips, etc. Furthermore, the surface of the dip-forming mold may have surface-treatment such as glossing, semi-glossing, non-glossing and fabric patterning on the whole or partially.

A coagulant solution is a solution of a coagulant such as a salting agent dissolved in water, alcohol or a mixture thereof. As a salting agent, there may be mentioned metal halides, nitrates, sulfates, etc.

Next, the mold whereon the coagulant is adhered is dipped in the above-mentioned dip-forming latex composition of the present invention and then pulled out to form a dip-formed rubber layer thereon.

In the present invention, it is preferable that the dip-formed rubber layer may be dipped in warm water at 20 to 80° C. for 0.5 to 60 minutes or so to remove water-soluble impurities (for example, excessive emulsifying agent, water-soluble polymers, coagulant, etc.) before heat treatment.

The dip-formed rubber layer formed on the dip-forming mold is then heated to cross-link the conjugated diene rubber. A temperature of heat treatment is preferably 60 to 160° C. and more preferably 80 to 150° C. Too low temperature is liable to reduce productivity since cross-linking reaction requires substantial time. On the other hand, too high temperature may cause to lower physical properties of the article due to stimulating oxidization degradation of the conjugated diene rubber. Time for heat treatment may be properly chosen according to the temperature of heat treatment, and usually 5 minutes or more and 2 hours or less.

Next, the dip-formed rubber layer cross-linked by heat treatment is removed from the dip-forming mold to obtain the dip-formed article. The layer may be stripped from the mold by hand or by using hydraulic pressure or compressed air.

After removing from the mold, the layer may be further heat-treated at 60 to 120° C. for 10 to 120 minutes (post-crosslinking step). Dip-formed articles may have a surface-treated layer formed by chlorination, coating, etc., on its inside and/or outside surfaces.

Also, the dip-formed article of the present invention may include an object to be coated (to be dip-formed) that is used instead of the above mentioned dip-forming mold. Note that it is not necessary to remove the mold as above in this case.

The dip-formed article of the present invention, where the above mentioned dip-forming latex composition of the present invention is used to produce, can be made thin having a preferable thickness of about 0.05 mm to about 3 mm and a more preferable thickness of 0.05 to 0.3 mm. It also exhibits good softness of touch, is superior in tensile strength and resistance to flexing fatigue, hardly causes coloration and odor, and is high in retention ratio of stress and easy to fit users' hands and fingertips. Therefore, as specific application, there may be mentioned medical goods such as nipples, droppers, catheter and water pillows; toys or sport goods such as balloons, dolls and balls; industrial articles such as pressure-molding bag and gas-storage bag; gloves for surgery use, home use, agricultural use, fishery use or industrial use; and finger cots; etc. In particular, the dip-formed articles of the present invention are suitable for thin surgery gloves since they are excellent in the fitting characteristics. Note that the gloves may be supported-type or unsupported-type.

Second Embodiment

Next, the dip-forming latex composition according to the second aspect of the present invention and the dip-formed article obtained by dip-forming of the latex composition will be explained.

Dip-Forming Latex Composition

The dip-forming latex composition according to the second aspect of the present invention includes at least a carboxylated nitrile rubber latex and an organic peroxide.

Carboxylated Nitrile Rubber Latex

Carboxylated nitrile rubber latex is latex of nitrile rubber obtained by polymerizing a conjugated diene monomer, an ethylenically unsaturated nitrile monomer, and a carboxyl group-containing ethylenically unsaturated monomer containing carboxyl group. Using such a latex provides a dip-formed article which is soft, excellent in oil resistance and mechanical strength, and sufficiently large in tensile strength and elongation at break.

As a conjugated diene monomer, aliphatic conjugated diene compound having 4 to 12 carbon atoms can be used. There may be mentioned, for example, 1,3-butadiene, isoprene, 2,3-dimethyl-1,3-butadiene, halogen-substituted butadiene, etc. These monomers can be used alone or in a combination of two or more. Among them, 1,3-butadiene is preferably used.

The amount of the conjugated diene monomer is preferably 30 to 88 wt %, more preferably 50 to 84 wt %, and particularly preferably 55 to 81 wt % per 100 wt % of the total amount of monomers. Too small amounts tend to give articles with poor softness of touch while too large amounts tend to give those with low tensile strength.

As a carboxyl group-containing ethylenically unsaturated monomer, an ethylenically unsaturated monomer, which contains carboxyl group and has 3 to 18 carbon atoms, is used. For example, those mentioned in the above first aspect can be used as the carboxyl group-containing ethylenically unsaturated monomer. The carboxyl group-containing ethylenically unsaturated monomer can be an alkali metal salt or ammonium salt, and used alone or in a combination of two or more.

The amount of carboxyl group-containing ethylenically unsaturated monomer is preferably 0.5 to 10 wt %, more preferably 1 to 9 wt %, and particularly preferably 2 to 8 wt % per 100 wt % of the total amount of monomers. Too small amounts tend to give articles with low tensile strength while too large amounts tend to give those with poor softness of touch.

As an ethylenically unsaturated nitrile monomer, an ethylenically unsaturated monomer, which contains nitrile group and has 3 to 18 carbon atoms, is used. There may be mentioned, for example, acrylonitrile, methacrylonitrile, halogen-substituted acrylonitrile, etc. These can be used alone or in combination of two or more. Among them, acrylonitrile is preferably used.

The amount of the ethylenically unsaturated nitrile monomer is preferably 2 to 69.5 wt %, more preferably 7 to 49 wt %, and particularly preferably 11 to 43 wt % per 100 wt % of the total amount of monomers. Too small amounts tend to give articles with low oil resistance while too large amounts tend to give those with poor softness of touch.

If required, a monomer capable of copolymerization with the above monomers may be used in the dip-forming latex composition according to the second aspect of the present invention. Such a monomer may include, for example, unconjugated diene, α-olefin, aromatic vinyl, ethylenically unsaturated monocarboxylic acid ester, fluoro-olefin, ethylenically unsaturated carboxylic amide, etc.

Next, a production method of the carboxylated nitrile rubber latex according to the second aspect will be explained.

The carboxylated nitrile rubber latex according to the second aspect can be produced by emulsion polymerization of mixture of each of the above-mentioned monomers as with the above mentioned conjugated diene rubber latex according to the first aspect. As a method of emulsion polymerization, methods known in the art can be used.

On emulsion polymerization, auxiliary agents for polymerization such as emulsifiers, initiators and molecular weight modifiers usually employed can be used as with in the first aspect. These auxiliary agents for polymerization can be those mentioned above in the first aspect. Note that it is preferable in the second aspect to especially use a relatively small amount of the molecular weight modifier of 0.2 to 0.7 part by weight in order to make an insoluble content of methyl ethyl ketone in the latex within a predetermined range as described later.

Emulsion polymerization is usually carried out in water by using the above monomers and auxiliary agents for polymerization. Conditions of emulsion polymerization may be referred to those in the above first aspect.

In the second aspect of the present invention, it is preferable that the carboxylated nitrile rubber latex included in the dip-forming latex composition has cross-linked latex particles, and it is particularly preferable that the cross-link is three-dimensional. Specifically, the carboxylated nitrile rubber latex has an insoluble content in methyl ethyl ketone (MEK insoluble content) in the latex particles (rubber component) of preferably 50 to 90 wt %, further preferably 60 to 90 wt %, and particularly preferably 70 to 85 wt % per 100 wt % of the whole rubber components in the latex particles. By forming cross-linking in particles of the carboxylated nitrile rubber latex and more specifically by adjusting MEK insoluble content in the latex within the above range, retention ratio of stress of the dip-formed article can fall within a predetermined range of the present invention. It results in improving the fitting characteristics. Too small amounts of MEK insoluble content tend to give articles with low retention ratio of stress while too large amounts tend to give those poor in film formation property.

Note that MEK insoluble content can be measured by comparing the weight difference between values before and after immersing the carboxylated nitrile rubber latex in methyl ethyl ketone (MEK) at 20° C., for example. A time for the immersion is not particularly limited as far as it is a time to dissolve the soluble portions sufficiently in MEK, and it may be 48 hours or so, for example. Also, as a method to make MEK insoluble content within the above range by adjusting cross-link in the latex particles, there may be mentioned, for example, a method to change an amount of the molecular weight modifier, a method to change polymerization conditions (temperature and time for polymerization), etc.

A pH value of the carboxylated nitrile rubber latex is preferably 9 or lower, more preferably within the range of 7 to 9, and furthermore preferably within the range of 7.5 to 8.7 in the second aspect of the present invention as in the above-mentioned first aspect. By adjusting a pH value within the above range, it is possible to effectively prevent deactivation caused by degradation of organic peroxide when adding organic peroxide to obtain a dip-forming latex composition.

Organic Peroxide

Organic peroxide same as in the above-mentioned first aspect can be used in the second aspect. The amount may be same as in the first aspect as well.

Residual effective activity of the organic peroxide, defined as a ratio of organic peroxide actually retaining reactivity to the whole organic peroxide initially added into the dip-forming latex composition, is preferably 35% or higher, more preferably 40% or higher and further preferably 45% or higher in the second aspect of the present invention as in the above-mentioned first aspect. It is most characteristic in the present invention that residual effective activity of the organic peroxide is controlled within the above range. It results in a dip-formed article with improved retention ratio of stress, resistance to flexing fatigue and fitting characteristics.

Production Method of Dip-Forming Latex Composition

The dip-forming latex composition according to the second aspect can be prepared by adding the above-mentioned organic peroxide to the above-mentioned carboxylated nitrile rubber latex.

As a method to add the organic peroxide to the carboxylated nitrile rubber latex in the second aspect, although not particularly limited, there may be mentioned, for example, a method where a powdery or liquid organic peroxide is directly added to the latex, a method where an organic peroxide preliminarily dissolved in a variety of organic solvent is added to the latex, and a method where an organic peroxide emulsified in water with a emulsifier after dissolving in an organic solvent is added to the latex.

It is preferred in the second aspect to add the organic peroxide directly, or in an organic solution or in emulsified form to the carboxylated nitrile rubber latex, followed by mixing and aging. Aging conditions may be same as in the above-mentioned first aspect. Also in the second aspect, it is possible to obtain a dip-formed article having desired characteristics even when the aging time is relatively short because of the same reason.

Concentration of solid content of the dip-forming latex composition may be same as in the above-mentioned first aspect. Although sulfur, a curing accelerator and zinc oxide may be added, it is preferred not to add these considering a balance in physical properties of a dip-formed article as in the first aspect.

Dip-Formed Article

The dip-formed article according to the second aspect of the present invention can be obtained by dip-forming of the above-mentioned dip-forming latex composition, and has retention ratio of stress of 50% or larger, preferably 50 to 80%, and more preferably 55 to 75%. The dip-formed article according to the second aspect is superior in the fitting characteristics to hand and fingers particularly when the article is a glove since it has the retention ratio of stress controlled within the above range. In addition, it is possible to effectively prevent reduction of the fitting characteristics when wearing for a long period of time.

Note that the retention ratio of stress (%) is defined as a ratio $[(M100(6)/M100(0))\times 100]$ of tensile stress $M100(0)$ at the time of 100% elongation to tensile stress $M100(6)$ after 6 minutes when elongating the dip-formed article by 100% and leaving the 100%-elongated article for 6 minutes.

As a dip-forming method to obtain the dip-formed article according to the second aspect, methods known in the art can be used, and may be same as in the above-mentioned first aspect for example.

The dip-formed article according to the second aspect of the present invention can be thinner with the thickness of preferably about 0.05 to about 3 mm, and more preferably 0.05 to 0.3 mm because of using the above-mentioned dip-forming latex composition. It exhibits good softness of touch, has excellent tensile strength and resistance to flexing fatigue, and hardly suffers coloration or odor. It also excellently fits to user's hand and fingers since the retention ratio of stress is controlled within the above range. The dip-formed article according to the second aspect can be used in the same applications introduced in the above first aspect.

EXAMPLES

Below, the present invention will be specifically explained by using examples and comparative examples. [parts] and [%] in the examples, unless otherwise designated, indicate units of weight. Note that the present invention is not limited to the examples. Also note that the dip-forming latex composition and the dip-formed article were evaluated by the following methods.

Amount of Precipitated Cross-Linker

An amount of a precipitated crosslinker was evaluated by filtering the dip-forming latex composition with a metal mesh of 325 meshes, measuring a weight of the residue of the crosslinker on the metal mesh and calculating a percent ratio of the weight of the residue of the crosslinker per total weight of actually added crosslinker. The fewer amounts of the precipitated crosslinker are more preferable. Note that the present evaluation was performed for Examples 1 to 7 and Comparative Examples 1 to 3.

Residual Effective Activity of Organic Peroxide

Residual effective activity of the organic peroxide was determined by measuring iodine molecules generated by active organic peroxide by iodimetry. First, 2 g in solid content of the dip-forming latex composition was weighed in an Erlenmeyer flask followed by adding 40 g of a (9:1) solution of methyl ethyl ketone and ethanol thereto to disperse/dissolve the dip-forming latex composition. Next, to the solution, 1-2 ml of 50% potassium iodide solution was added and sufficiently mixed, and then, left in a cool and dark space for 10 minutes. Thus obtained solution was titrated with 0.01N of sodium thiosulfate solution as an end-point of disappearing brownish-red color due to iodine to determine an amount of active organic peroxide. Note that the solution of methyl ethyl ketone and ethanol used in the measurement was also subject to iodimetry, to use the resulting value as a blank.

A percent weight ratio of the amount of the active organic peroxide determined by the above titration per total weight of actually added organic peroxide was calculated as residual effective activity of the organic peroxide (in %). Note that the present evaluation was performed for all examples and comparative examples.

300% Tensile Stress, Tensile Strength and Elongation

A dumbbell-shaped test specimen was prepared from the obtained rubber glove (dip-formed article) by using the dumbbell (Die-C) according to ASTM D-412. Next, the test specimen was pulled at a pulling speed of 500 mm/min to measure a tensile stress (MPa) at elongation rate of 300%, a tensile strength (MPa) at break and an elongation (%) at break. The smaller 300% tensile stress results in the articles, the better softness of touch and the more comfortable fittingness. Note that the present evaluation was performed for all examples and comparative examples.

Retention Ratio of Stress

Tensile stress in a rate of 500 mm/min was applied on both ends of the dumbbell-shaped test specimen prepared in the above method according to ASTM D412-92. When the standard interval of 20 mm of the test specimen was elongated to 40 mm (100% elongation), there were measured a tensile stress M100(0) at the time of elongation and a tensile stress M100(6) after being elongated for 6 minutes. A percent ratio of M100 (6) per M100 (0) was calculated as a retention ratio of stress. When the retention ratio of stress is preferably 50% or larger, the articles excellently fit to user's hand and finger. Note that the present evaluation was performed for all examples and comparative examples.

Resistance to Flexing Fatigue 10 testers wore the obtained rubber glove (dip-formed article) and worked on light duty of keyboard input. At every 30 minutes after starting the work, occurrence of minute crack was examined visually at the crotches of fingers of gloves. The time when minute crack occurred was determined for each glove worn by the testers, and the arithmetic mean of 8 values (data from 8 testers) was calculated excluding the shortest and the longest values. Note that this wearing test was done for a maximum of 6 hours. The longer duration represents the higher resistance to flexing fatigue. Note that the present evaluation was performed for all examples and comparative examples.

Fitting Characteristics (Adhesiveness & Following Characteristics)

10 testers wore the obtained rubber glove (dip-formed article) and worked on light duty of keyboard input for an hour. The number of testers who felt that the rubber glove did not fit after an hour work was counted to evaluate fitting characteristics based on the following:

0-2 testers out of 10 felt not fitting: A;
3-7 testers out of 10 felt not fitting: B;
8-10 testers out of 10 felt not fitting: C.

Note that the present evaluation was performed for all examples and comparative examples.

MEK Insoluble Content in the Carboxylated Nitrile Rubber Latex

First, the carboxylated nitrile rubber latex was flowed casting into a framed glass plate followed by incubation at 25° C. for 4 days to obtain a film. The obtained film was then precisely weighed out in a predetermined weight (weight $W_0$), and placed in a wire mesh basket with 80 meshes to immerse in methyl ethyl ketone (MEK) at 20° C. for 48 hours. Then, after the immersed basket was drawn and dried in a vacuum at 25° C. for 2 days, an amount of latex film remaining in the basket without being dissolved in MEK (weight $W_1$) was precisely weighed. Finally, the MEK insoluble content was determined based on the obtained weights $W_0$ and $W_1$ according to the following equation:

$$\text{MEK Insoluble Content (wt \%)} = (W_1/W_0) \times 100 \quad (1)$$

Color Change (Color Change by Cupric Ion)

The obtained rubber glove (dip-formed article) was dipped in 3% aqueous solution of copper sulfate for 30 seconds, and the degree of color change after an hour was examined by visual observation. The results were shown as below:

The rubber glove did not change in color: A;
The rubber glove changed to pale yellow: B;
The rubber glove changed to yellow: C.

The gloves wherein color change was observed in the above test were considered as easily changing in color when wearing for a long time. Note that the present evaluation was performed for Examples 8-12 and Comparative Examples 4-6.

Odor 10 testers wore the obtained rubber glove (dip-formed article) and worked on light duty of keyboard input for an hour. The number of testers who felt uncomfortable due to odor after an hour work was counted to evaluate odor based on the following:

0-2 testers out of 10 felt uncomfortable: A;
3-7 testers out of 10 felt uncomfortable: B;
8-10 testers out of 10 felt uncomfortable: C.

Note that the present evaluation was performed for Examples 8-12 and Comparative Examples 4-6.

Production Example 1

Into a polymerization reactor were charged 22 parts of acrylonitrile, 73 parts of 1,3-butadiene, 5 parts of methacrylic acid, 0.3 part of t-dodecylmercaptan, 132 parts of ion-exchanged water, 3 parts of sodium dodecylbenzenesulfonate, 0.5 part of sodium salt of β-naphthalene sulfonic acid-formalin condensate, 0.3 part of potassium persulfate and 0.05 part of sodium ethylenediaminetetraacetate. Polymerization was started with a polymerization temperature kept at 37° C. At 60% conversion, 0.15 part of t-dodecylmercaptan was added, followed by raising a polymerization temperature to 40° C., and the polymerization was continued up to 94% conversion. Then, polymerization was terminated by adding 0.1 part of sodium dimethyldithiocarbamate as a terminator.

After removal of unreacted monomers from the obtained copolymer latex, its pH value and solid content were adjusted to obtain carboxylated nitrile rubber latex A with concentration of solid content of 40% and pH value of 8. The MEK insoluble content in the latex was 82%.

Production Examples 2-4

Except for changing the amounts of acrylonitrile, 1,3-butadiene and methacrylic acid to those shown in Table 1, carboxylated nitrile rubber latexes B to D by Production Examples 2 to 4 were obtained as with Production Example 1. Note that these latexes B to D had concentration of solid content of 40% and pH value of 8 as in Production Example 1, and the MEK insoluble content were those shown in Table 1.

TABLE 1

|  | Production Example 1 A | Production Example 2 B | Production Example 3 C | Production Example 4 D |
|---|---|---|---|---|
| 1,3-butadiene (parts by weight) | 73 | 72 | 63 | 62 |
| Acrylonitrile (parts by weight) | 22 | 22 | 32 | 32 |
| methacrylic acid (parts by weight) | 5 | 6 | 5 | 6 |
| MEK insoluble content (wt %) | 82 | 82 | 84 | 82 |

Example 1

Dip-Forming Latex Composition

First, 24 parts of dibenzoyl peroxide (moisture absorption of 25%, hereinafter referred to as BPO), 0.6 part of sodium linear alkylsulfate as an anionic surfactant and 9 parts of hydroxypropylcellulose was dissolved in water. The solution was then vigorously stirred using a homomixer at revolution speed of 7000 rpm for 30 minutes to prepare BPO dispersion with a BPO concentration of 30%.

Next, to carboxylated nitrile rubber latex A (MEK insoluble content of 82 wt %) obtained in Production Example 1, 5% aqueous solution of potassium hydroxide was added to adjust pH value to 7.0 while heating at 45° C. To the heated latex A, BPO dispersion (emulsion) prepared as above was added, followed by adding ion-exchanged water to obtain concentration of solid content of 30%. It was then stirred (aged) at a temperature of 20° C. for 4 hours to uniformly disperse BPO, so that the dip-forming latex composition was prepared. Note that BPO dispersion was added to finally obtain 1.0 part of BPO based on 100 parts of solid contents in the latex in the present example.

Then, the above-obtained dip-forming latex composition was stored at a temperature of 30° C. for 1 day. For the post-stored dip-forming latex composition, precipitation of crosslinker and residual effective activity of the organic peroxide were examined respectively by using the above mentioned methods. The results are shown in Table 2. Also, pH value after aging of the post-stored dip-forming latex composition was 7.

Rubber Glove (Dip-Formed Article)

Next, pH value of the post-stored dip-forming latex composition obtained as above was adjusted to 9.2 right before dip-forming, and the latex composition was used to produce a rubber glove (dip-formed article) by the following method.

First, 20 parts of calcium nitrate, 0.05 part of polyethyleneglycol octyl phenyl ether, which is a non-ionic emulsifier, and 80 parts of water were mixed to prepare an aqueous coagulant solution. Next, a glove-mold was dipped in the aqueous coagulant solution for 5 seconds, drawn out and dried at 50° C. for 10 minutes to adhere the coagulant to the glove-mold. Then, the glove-mold with the coagulant adhered was dipped in the above-obtained dip-forming latex composition for 6 seconds, drawn out, dried at 50° C. for 10 minutes, and dipped in warm water at 40° C. for 3 minutes to leach out water-soluble impurities, so that the dip-formed rubber layer was formed in the glove-mold.

Then, the glove-mold with the dip-formed rubber layer was dried at 70° C. for 10 minutes followed by heat-treatment at 120° C. for 20 minutes to crosslink the dip-formed rubber layer. Finally, the crosslinked dip-formed rubber layer was stripped off the glove-mold to obtain a rubber glove (dip-formed article) of 0.1 mm in thickness. For the obtained glove, 300% tensile stress, tensile strength, elongation, retention ratio of stress, resistance to flexing fatigue and fitting characteristics were evaluated by the above methods. The results are shown in Table 2.

Examples 2 & 3

Except for changing pH values of carboxylated nitrile latex before adding a crosslinker to 8.0 (Example 2) and 9.0 (Example 3) respectively, dip-forming latex compositions and rubber gloves (dip-formed articles) were produced by the same procedures as Example 1.

Example 4

Except for changing aging time after adding organic peroxide solution to 10 hours, dip-forming latex composition and a rubber glove were produced by the same procedures as Example 1.

Example 5

Except for changing storage time after preparing the dip-forming latex composition from a day to 6 months, dip-forming latex composition and a rubber glove were produced by the same procedures as Example 2.

Examples 6 & 7

Except for changing an amount of BPO as a crosslinker to 2 parts (Example 6) and 6 parts (Example 7) respectively, dip-forming latex compositions and rubber gloves were produced by the same procedures as Example 2.

Comparative Example 1

Except for changing pH value of the latex before adding crosslinker to 10 and storage time after preparing the dip-forming latex composition from a day to 6 months, dip-forming latex composition and a rubber glove were produced by the same procedures as Example 1.

Comparative Example 2

Except for changing pH value of the latex before adding crosslinker to 6, dip-forming latex composition and a rubber glove were produced by the same procedures as Example 1.

Comparative Example 3

Except for changing pH value of the latex before adding crosslinker to 9.5 and aging time after adding organic peroxide solution to 2 hours, dip-forming latex composition and a rubber glove were produced by the same procedures as Example 1.

within the range of the present invention resulted in the articles having superior properties such as 300% tensile stress, tensile strength, elongation, retention ratio of stress, resistance to flexing fatigue and fitting characteristics. Among them, Examples 1-6 having amounts of crosslinker within the preferable range of the present invention gave especially excellent results. It was also confirmed from the results of Example 5 having storage time of 6 months that the dip-forming latex composition of the present invention is excellent in storing stability.

Example 8

Dip-Forming Latex Composition

First, to 10 parts of toluene was added 5 parts of dibenzoyl peroxide (moisture absorption of 25 wt %, hereinafter referred to as BPO) to dissolve at 45° C. To the obtained solution with stirred, 15 parts of 1.7% aqueous solution of sodium dodecylbenzenesulfonate (emulsion) was added to obtain BPO emulsion.

Next, to carboxylated nitrile rubber latex A (MEK insoluble content of 82 wt %) obtained in Production

TABLE 2

|  | Examples | | | | | | | Comparative Examples | | |
|---|---|---|---|---|---|---|---|---|---|---|
|  | 1 | 2 | 3 | 4 | 5 | 6 | 7 | 1 | 2 | 3 |
| Dip-Forming Latex Composition | | | | | | | | | | |
| Type of Latex | A | A | A | A | A | A | A | A | A | A |
| pH value before adding crosslinker | 7 | 8 | 9 | 7 | 8 | 8 | 8 | 10 | 6 | 9.5 |
| Type of crosslinker | BPO | BPO | BPO | BPO | BPO | BPO | BPO | BPO | BPO | BPO |
| Amount of crosslinker (phr) | 1 | 1 | 1 | 1 | 1 | 2 | 6 | 1 | 1 | 1 |
| Aging time (hr) | 4 | 4 | 4 | 10 | 4 | 4 | 4 | 4 | 4 | 2 |
| pH after aging | 7 | 8 | 7 | 7 | 7 | 7 | 7 | 7 | — | 7 |
| Amount of precipitated crosslinker (%) | 0 | 0 | 0 | 0 | 0 | 0 | 15 | 0 | — | 35 |
| Storage time | 1 day | 1 day | 1 day | 1 day | 6 months | 1 day | 1 day | 6 months | — | 1 day |
| Residual effective activity (%) | 50 | 48 | 49 | 46 | 45 | 48 | 35 | 10 | — | 25 |
| Dip-Formed Article | | | | | | | | | | |
| 300% tensile stress (MPa) | 2.3 | 2.2 | 2.4 | 2.2 | 2.4 | 2.6 | 3 | 1.8 | — | 2 |
| Tensile strength (MPa) | 24 | 23 | 24 | 24 | 23 | 27 | 20 | 15 | — | 19 |
| Elongation (%) | 630 | 650 | 630 | 640 | 620 | 600 | 580 | 750 | — | 720 |
| Retention ratio of stress (%) | 61 | 63 | 60 | 62 | 65 | 60 | 50 | 47 | — | 49 |
| Resistance to flexing fatigue | >6 Hr | >6 Hr | >6 Hr | >6 Hr | >6 Hr | >6 Hr | 5 Hr | 0.5 Hr | — | 2 Hr |
| Fitting characteristics | A | A | A | A | A | A | A | C | — | C |

Evaluation 1

Table 2 indicates the following:

In Comparative Example 1 wherein the pH value before adding crosslinker was 10 and storage time was 6 months, and Comparative Example 3 wherein the pH value before adding crosslinker was 9.5 and aging time was 2 hours, the residual effective activity of organic peroxide was 10% (Comparative Example 1) and 25% (Comparative Example 3) respectively, resulting in the articles with inferior resistance to flexing fatigue and fitting characteristics.

In the case of Comparative Example 2 with the pH value before adding crosslinker of 6, the latex clotted in an hour after adding crosslinker, so that the composition and the article to examine were not obtained.

On the other hand, Examples 1-7 wherein the pH values before adding crosslinker was in the range of 7-9 and the residual effective activity of organic peroxide was controlled Example 1, 5% aqueous solution of potassium hydroxide was added to adjust the pH value to 9.2 while heating at 45° C. To the heated latex A, BPO dispersion (emulsion) prepared as above was added, followed by further adding ion-exchanged water to obtain concentration of solid content of 30%. It was then stirred (aged) at a temperature of 20° C. for 4 hours to uniformly disperse BPO, so that the dip-forming latex composition was prepared. Note that the dip-forming latex composition was prepared to include 1.0 part of BPO based on 100 parts of solid contents in the latex in the present example.

Then, the above-obtained dip-forming latex composition was stored at a temperature of 30° C. for 1 day. For the post-stored dip-forming latex composition, residual effective activity of the organic peroxide was examined by using the above method. As a result, the residual effective activity of the organic peroxide was 75%.

Rubber Glove (Dip-Formed Article)

Next, except for using the above prepared dip-forming latex composition, a rubber glove (dip-formed article) having a thickness of 0.1 mmm was obtained as in the above Example 1. 300% tensile stress, tensile strength, elongation, retention ratio of stress, resistance to flexing fatigue, color change (by cupric ion), odor and fitting characteristics of the obtained rubber glove (dip-formed article) were evaluated by the above methods. The results are shown in Table 3.

Examples 9-11

Except for using the latex B obtained by Production Example 2 (Example 9: 82 wt % of MEK insoluble content), the latex C obtained by Production Example 3 (Example 10: 84 wt % of MEK insoluble content) and the latex D obtained by Production Example 4 (Example 11: 82 wt % of MEK insoluble content) respectively instead of the latex A, dip-forming latex compositions and rubber gloves (dip-formed articles) were produced as in Example 8. Note that the following was the results when residual effective activity of organic peroxide for the dip-forming latex composition in each example was evaluated as in Example 8: 77% in Example 9, 77% in Example 10 and 76% in Example 11.

Example 12

Except for changing stirring (aging) time to uniformly disperse BPO to 28 hours, a dip-forming latex composition and a rubber glove (dip-formed article) were produced as in Example 8. Note that residual effective activity of organic peroxide for the dip-forming latex composition in Example 12 was 48% as a result of evaluation as in Example 8

Comparative Example 4

Except for using no BPO as a crosslinker and not stirring (aging) to uniformly disperse the crosslinker, a dip-forming latex composition and a rubber glove (dip-formed article) were produced as in Example 8.

Comparative Examples 5 & 6

Except for using sulfur dispersion including sulfur, zinc dibutyldithiocarbamate as its curing accelerator and zinc oxide instead of the above mentioned emulsion of BPO, and taking 4 hours (Comparative Example 5) and 28 hours (Comparative Example 6) respectively for stirring (aging) time after adding sulfur dispersion, a dip-forming latex composition and a rubber glove (dip-formed article) were produced as in Example 8. Note that amounts of sulfur, zinc dibutyldithiocarbamate as its curing accelerator and zinc oxide were 2 parts, 1 part and 1 part respectively based on 100 parts of solid contents in the latex in the Comparative Examples 5 and 6.

TABLE 3

|  | Examples | | | | | Comparative Examples | | |
| --- | --- | --- | --- | --- | --- | --- | --- | --- |
|  | 8 | 9 | 10 | 11 | 12 | 4 | 5 | 6 |
| Dip-Forming Latex Composition | | | | | | | | |
| Type of the latex | A | B | C | D | B | A | A | A |
| MEK insoluble content of the latex (wt %) | 82 | 82 | 84 | 82 | 82 | 82 | 82 | 82 |
| pH value of the latex | 9.2 | 9.2 | 9.2 | 9.2 | 9.2 | 9.2 | 9.2 | 9.2 |
| Type of crosslinker | BPO | BPO | BPO | BPO | BPO | — | Sulfur* | Sulfur* |
| Amount of crosslinker (phr) | 1 | 1 | 1 | 1 | 1 | 0 | 2 | 2 |
| Aging time (hr) | 4 | 4 | 4 | 4 | 28 | 0 | 4 | 28 |
| Dip-Formed Article | | | | | | | | |
| Retention ratio of stress (%) | 61 | 63 | 61 | 56 | 62 | 43 | 45 | 55 |
| 300% tensile stress (MPa) | 1.6 | 2.0 | 2.3 | 3.3 | 2.1 | 1.2 | 2 | 2.5 |
| Tensile strength (MPa) | 17 | 16 | 24 | 38 | 19 | 14 | 12 | 20 |
| Elongation (%) | 710 | 690 | 630 | 570 | 650 | 690 | 750 | 650 |
| Resistance to flexing fatigue | >6 Hr | >6 Hr | >6 Hr | >6 Hr | >6 Hr | 1 Hr | 3 Hr | >6 Hr |
| Color change | A | A | A | A | A | A | C | C |
| Odor | A | A | A | A | A | A | C | C |
| Fitting characteristics | A | A | A | A | A | C | C | A |

*In addition to sulfur as crosslinker, curing accelerator and zinc oxide were added in the Comparative Examples 5 & 6 in Table 3.

Evaluation 2

Table 3 indicates the following:

Comparative Example 4, including no organic peroxide and having retention ratio of stress without the specified range of the present invention, resulted in inferior resistance to flexing fatigue and fitting characteristics.

Further, Comparative Examples 5 and 6, including no organic peroxide and using sulfur as a crosslinker, showed inferior results in color change and odor. Especially in Comparative Example 5 having aging time of 4 hours, resistance to flexing fatigue was inferior as well as fitting characteristics. On the other hand, in Comparative Example 6 having long aging time of 28 hours, resistance to flexing fatigue and fitting characteristics were favorable. Based on these results of Comparative Examples 5 and 6, it was confirmed that very long aging time is required to improve resistance to flexing fatigue and fitting characteristics when using sulfur as a crosslinker.

On the other hand, Examples 8-12 having resistance to flexing fatigue within the specified range of the present invention provided excellent results in 300% tensile stress, tensile strength, elongation, resistance to flexing fatigue, color change and odor as well as fitting characteristics. Especially based on the results of Examples 8-11, it was confirmed to obtain the above respective properties even in the case of short aging time after adding organic peroxide of 4 hours.

The invention claimed is:

1. A production method of a dip-forming latex composition comprising in the following order a conjugated diene rubber latex and an organic peroxide, comprising:
   preparing said conjugated diene rubber latex by emulsion polymerization;
   removing unreacted monomers after polymerization is terminated;
   adding said organic peroxide to said conjugated diene rubber latex; and
   aging a resulting mixture at 10 to 50° C. for 1 hour or more;
   wherein residual effective activity of organic peroxide, defined as a ratio of organic peroxide retaining reactivity to said whole organic peroxide included in the dip-forming latex composition, is 35% or higher.

2. The production method of a dip-forming latex composition as set forth in claim 1, wherein pH value of the resulting dip-forming latex composition is 9 or lower.

3. The production method of a dip-forming latex composition as set forth in claim 1, wherein a 10-hour half-life temperature of said organic peroxide is 150° C. or lower.

4. The production method of a dip-forming latex composition as set forth in claim 1, wherein a content of said organic peroxide included in the latex composition is 0.01 to 5 parts by weight based on 100 parts by weight of solid content of said conjugated diene rubber latex.

5. The production method of a dip-forming latex composition as set forth in claim 1, wherein said conjugated diene rubber latex is a carboxylated nitrile rubber latex.

6. A production method of a dip-formed article, comprising:
   dip-forming the dip-forming latex composition obtained by the method as set forth in claim 1.

7. The production method of a dip-formed article as set forth in claim 6, wherein
   retention ratio of stress (%), defined as a ratio [(M100(6)/M100(0))×100] of initial tensile stress M100(0) at 100% elongation and tensile stress M100(6) after 6 minutes of 100% elongation, is 50% or higher.

8. A production method of a dip-formed article, comprising:
   dip-forming of the dip-forming latex composition obtained by the method as set forth in claim 5, wherein
   latex particle in said carboxylated nitrile rubber latex included in said dip-forming latex composition is cross-linked within the particle.

9. A production method of a dip-formed article, comprising:
   dip-forming of the dip-forming latex composition obtained by the method as set forth in claim 5, wherein
   latex particle in said carboxylated nitrile rubber latex included in said dip-forming latex composition contains 50 to 90 wt % of insoluble content in methyl ethyl ketone.

* * * * *